(12) United States Patent
Gitlin et al.

(10) Patent No.: US 10,348,709 B2
(45) Date of Patent: Jul. 9, 2019

(54) CUMULATIVE AUTHENTICATION FOR STEP-UP INCREASED AUTHENTICATION FACTORS

(71) Applicant: McAfee, Inc., Santa Clara, CA (US)

(72) Inventors: Gilad Gitlin, Austin, TX (US); Richard Reiner, Montreal (CA); John McDowell, Walnut, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/866,043

(22) Filed: Sep. 25, 2015

(65) Prior Publication Data

US 2017/0093829 A1    Mar. 30, 2017

(51) Int. Cl.
*H04L 9/00* (2006.01)
*H04L 29/06* (2006.01)

(52) U.S. Cl.
CPC .......... *H04L 63/08* (2013.01); *H04L 63/0846* (2013.01); *H04L 63/105* (2013.01)

(58) Field of Classification Search
CPC ....................................................... H04L 63/08
See application file for complete search history.

(56) References Cited

U.S. PATENT DOCUMENTS

| | | |
|---|---|---|
| 8,112,817 B2 | 2/2012 | Chiruvolu et al. |
| 8,307,412 B2 | 11/2012 | Ozzie et al. |
| 8,413,221 B2 | 4/2013 | Kaliski, Jr. et al. |
| 8,832,806 B2 | 9/2014 | Ozzie et al. |
| 9,344,419 B2 | 5/2016 | Ma |
| 2007/0101406 A1* | 5/2007 | Zavalkovsky ...... H04L 63/0815 726/4 |
| 2008/0313719 A1 | 12/2008 | Kaliski, Jr. et al. |
| 2009/0037983 A1 | 2/2009 | Chiruvolu et al. |
| 2010/0100945 A1 | 4/2010 | Ozzie et al. |

(Continued)

FOREIGN PATENT DOCUMENTS

WO    2014176539    10/2014

OTHER PUBLICATIONS

International Searching Authority, "International Search Report and Written Opinion," issued in connection with PCT patent application No. PCT/US2016/053243, dated Jan. 11, 2017, 11 pages.

(Continued)

*Primary Examiner* — Alexander Lagor
*Assistant Examiner* — Syed M Ahsan
(74) *Attorney, Agent, or Firm* — Hanley, Flight and Zimmerman, LLC

(57) ABSTRACT

Techniques are disclosed for providing an authentication service that performs authentication of users on behalf of a relying party. The authentication service receives authentication requirements from the relying party and compares those requirements with authentication capabilities of the user and user equipment. If the authentication requirements are met, the authentication service may perform authentication using the corresponding authentication factors. If the available authentication factors are insufficient or the user fails authentication using the authentication factors used by the authentication service, the relying party may be notified that authentication failed. Upon successful authentication, the authentication service notifies the requiring party that the user has been authenticated.

14 Claims, 6 Drawing Sheets

(56) References Cited

U.S. PATENT DOCUMENTS

| 2013/0042309 A1 | 2/2013 | Ozzie et al. |
| 2014/0289833 A1* | 9/2014 | Briceno ................. H04L 63/08 |
| | | 726/7 |
| 2015/0244696 A1 | 8/2015 | Ma |
| 2016/0087957 A1 | 3/2016 | Shah et al. |

OTHER PUBLICATIONS

International Searching Authority, "International Preliminary Report on Patentability," issued in connection with PCT patent application No. PCT/US2016/053243, dated Mar. 27, 2018, 8 pages.

* cited by examiner

CUMULATIVE AUTHENTICATION FOR STEP-UP INCREASED AUTHENTICATION FACTORS

TECHNICAL FIELD

Embodiments described herein generally relate to authentication of users in a network and more specifically to authentication of users by a third party utilizing multiple uniquely identifying criteria.

BACKGROUND ART

Historically user network authentication has been trivially implemented. Most of authentication schemes rely on a username and password combination that uniquely identifies a user on a system.

There have been some attempts to improve and better secure authentication by the use of various biometric approaches, such as iris scans, retina scans, as well as fingerprints scans. Ultimately, most of these authentication systems were limited to single stage authentication, with both a user identifier and a biometric instead of a password, as the biometric was unique enough to provide a level of security.

Data breaches and other lapses of security have rendered trivial authentication obsolete and insecure. Higher levels of security and authentication are being sought to protect confidential user information.

Two factor authentication is growing in popularity. Two factor authentication requires authenticating users to provide two methods of authentication, usually in the form of the username and password combination plus another form of authentication. Some examples include automated telephone callbacks to known telephone numbers associated with the user, as well as digital fob generated keys that have been associated with the user.

As service providers are seeking to focus on their core business, there have been attempts to utilize third party authentication systems. These configurations utilize existing session cookie files from other websites, where authentication has already been performed, and the user's identity is not in question, thereby relying on the third party authentication system to allow access. These methods do not provide sufficient security as they depend on the (usually password-based) authentication performed previously by the service provider. Services that deal in highly confidential information, such as medical providers and financial institutions, would also prefer more mechanisms for secure authentication. A flexible and more robust method of performing authentication would be desirable.

DESCRIPTION OF EMBODIMENTS

Figure 1:
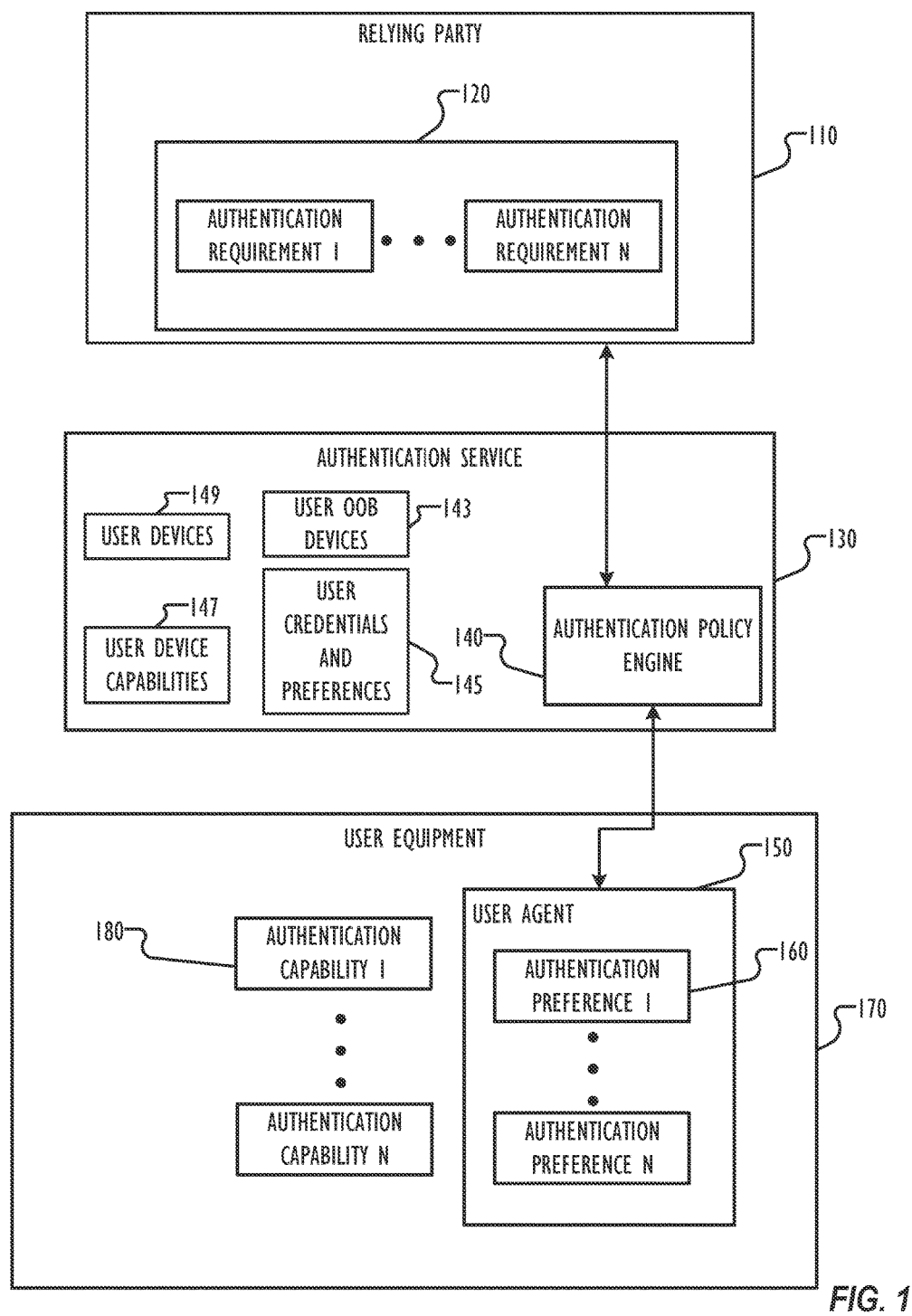
FIG. 1 is a block diagram illustrating an authentication system according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system. Similarly, the term "computer" should be understood as including any form of programmable device, including mobile devices.

The term "machine readable medium" can refer to a single physical medium or a collection of physical media that together store data or instructions described as being stored on the medium.

As used herein, "credentials" refers to any information which can be used to authenticate a user. For example, in a username and password authentication technique, the credential is the password; in biometric authentication techniques, the credentials are the biometric data that are used to authenticate the user. A plurality of credentials of varying types may be used for authentication of the user.

As used herein, a user is a human individual. From time to time, the user may seek access to resources that require authentication before granting access.

As used herein, a relying party is a system, such as a web site or an application that requires authentication before granting access to a resource.

As used herein, an authentication service is a service, typically cloud-based, that authenticates users on behalf of relying parties. Authentication may involve one or more authentication factors.

As used herein, an authentication factor is a single authenticator, having an authentication factor type.

As used herein, an authentication factor type is a type of authenticator, and may include: fingerprints, passwords, out-of-band verification, email verification, iris scans, visible light facial recognition, visual light 3-dimensional facial recognition, infrared facial recognition, trusted wireless (WI-FI®) networks, BLUETOOTH® device proximity, GSM®-based geolocation, WI-FI-based geolocation, and Global Positioning Satellite (GPS)-based geolocation. (WI-FI is a registered trademark of Wi-Fi Alliance; Bluetooth is a registered trademark of the Bluetooth Special Interest Group; and GSM is a registered trademark of the GSM Association.) These authentication factor types are illustrative and by way of example only, and any type of authentication factor may be used.

Authentication as used herein refers to matching the credentials provided by the user with credentials associated with the user's identifier that were obtained at enrollment of the user or thereafter. If a user provides valid credentials, the authentication succeeds; if not, authentication fails. Authentication may involve using multiple credentials and multiple authentication techniques. A user enrolls with the authentication service prior to an attempt to access an authenticate resource, establishing an identifier and providing user information, such as credentials, that may be used for later authentication purposes, and registering devices that are associated with the user.

Although described below in terms of software modules and algorithms, all or any desired portion of the techniques may be implemented in hardware, software, or firmware, or any combination thereof.

With the need for better user authentication and security, new methods of authentication have been devised and are currently being developed. These authentication methods can be categorized, based on an intrinsic feature of the authentication. For example, biometric authentication utilizes a physical feature unique to the user for verification. Often these authentication methods are not only unique but quite static in that they rarely change. An example of a biometric authentication method that is unique and relatively static would be an iris scan.

An authentication service is described below that abstracts authentication of users from the system to which access to some resource is sought. The authentication service is a trusted partner of the system to which access is sought (the relying party). The relying party presents authentication requirements of different forms to the authentication service, trusts that the authentication service validates the authentication requirements and the user's credentials, and grants or denies access, based on the indication received from the authentication service.

This provides the relying party with the advantageous effect of presenting only requirements of authentication, and not managing the authentication itself.

Another advantage from the user's perspective is that authentication is administered by one party, which then communicates that authentication with other relying parties. This provides the user with a time savings in that the user may be authenticated to multiple relying parties with only a single entry of credentials.

Formal Overview

Each authentication factor type is considered to have an authentication value, which may be an integer value. Generally an authentication factor type with a higher authentication value is considered a more reliable authentication factor; an authentication factor type with a lower authentication value is considered a less reliable authentication factor.

Relying party:

Establishes an authentication requirement in the form of either:

(i) a minimum authentication score $R_S$ (an integer), or (ii) a minimum authentication score $R_S$ together with a list of permitted authentication factor types (with 1 to N elements) $R_P$ Authentication service:

Maintains, for each user U:

(i) a list $D_U$ (with 1 to N elements) of that user's registered devices, each identified with strong cryptographic means of device identification.

(ii) for each device in list $D_U$, a list $D_{UF}$, of the authentication factors that are available on that device and in which the user is fully enrolled, together with the authentication factor type of each such authentication factor.

(iii) a list $O_U$, a (possibly empty) sublist of $D_U$, of that user's registered devices which are capable of performing authentication of type Out-of-Band.

(iv) and the user's authentication preferences in the form of EITHER (a) a list $T_U$ (with 0 to N elements) of that user's preferred authentication factor types, OR (b) for each device in list $D_U$, for each list $D_{UF}$, a list $D_{UFP}$, a (possibly empty) sublist of $D_{UF}$, of the user's preferred authentication factors among those that are available on that device and in which the user is fully enrolled.

When a user U wishes to authenticate to a Relying Party R while using Device D:

1. The Authentication Service obtains from R its minimum authentication score $R_S$ and the optional list of permitted authentication factors (with 1 to N elements) $R_P$ 2. The Authentication Service consults $D_{UF}$ and $O_U$ and forms the list of candidate authenticators C by taking each element of $D_{UF}$ together additional elements formed by taking each device in $O_U$ with the authentication type Out-of-band.

3. The list C is now filtered as follows, forming the filtered candidate list FC:

(a) If the user's authentication preferences are established in the form $T_U$, then all authentication factors not being of one of the types in $T_U$ are deleted.

(b) If the user's authentication preferences are established in the form $D_{UFP}$, then all elements of C not appearing in $D_{UFP}$ are deleted.

4. The Authentication Service now attempts to find a subset F of FC as follows:

(a) If R provided only a minimum authentication score $R_S$, then the Authentication Service attempts to find a subset F of FC such that the sum of the authentication values of the elements of the subset is equal to or greater than $R_S$.

(b) If R provided both a minimum authentication score $R_S$ and a list of permitted authentication factor types $R_P$ then the Authentication Service attempts to find some subset of F of FC such that the each element of F is of one of the types in $R_P$ and the sum of the authentication values of the elements of the subset is equal to or greater than $R_S$.

5. If the Authentication Service was successful in finding a subset F satisfying the above constraints, the user is authenticated using each of the factors in F, and the result of the authentication attempt (success or failure) is communicated to R.

6. If the Authentication Service was not successful in finding a subset F satisfying the above constraints, then the process of steps 4-5 is repeated using C in place of FC.

7. Otherwise, an indication is communicated to R that insufficient authentication factors are available to attempt to authenticate U.

Cumulative Authentication: In this approach, previous authentications by a user may be reused, allowing a user to authenticate to the authentication service for accessing one relying party and have at least some of those authentications reused with accessing a second relying party. In addition to the information described above as maintained by the authentication service, the authentication service also maintains the user's current authentication state $A_U$, a list of tuples (d∈$D_{UF}$, t) indicating which factors the user authenticated with at which time. This list is continuously updated such that tuples in which the interval from the present time to t exceeds the validity period for that type of authenticator are deleted.

When a user U wishes to authenticate to a Relying Party R while using Device D, in addition to the actions described above:

1. The authentication service computes the user's current authentication score $S_U$ by taking each element in $A_U$ and computing the sum of the authentication values based on the authentication factors types for each device d.

2. If $R_S \leq S_U$, then the user is already fully authenticated, and the authentication service may indicate successful authentication without requesting credentials from the user U.

3. If $R_S > S_U$, the authentication service forms a list of candidate authenticators C by taking each element of $D_{UF}$ together additional elements formed by taking each device in $O_U$ with the authentication type Out-of-band.

4. The list C may now be filtered by other criteria, forming a subset FC.

5. The Authentication Service now attempts to find a subset F of FC such that the sum of the authentication values of the elements of the subset is equal to or greater than $R_S$-$S_U$.

6. If the Authentication Service was successful in finding a subset F satisfying the above constraints, the user is authenticated using each of the factors in F, and the result of the authentication attempt (success or failure) is communication to R.

7. If the Authentication Service was not successful in finding a subset F satisfying the above constraints, then the process of steps 4-5 is repeated using C in place of FC.

8. Otherwise, an indication is communicated to R that insufficient authentication factors are available to attempt to authenticate U Variants:

(a) The authentication values of authentication factor types may be selected by the relying party and communicated to the authentication service.

(b) The authentication validity periods of authentication factor types may be selected by the relying party R and communicated to the authentication service.

FIG. 1 is an embodiment of a system operable to administer user authentication preferences and authentication policy requirements.

The relying party 110 may be any third party wanting authentication before allowing users to access resources or functionality. Example relying parties may include website administration systems, remote human users, or interfaces into other automated systems.

The relying party 110 may request a specific level of user authentication.

In one embodiment, the set of authentication requirements 120 is a well-defined set of authentication requirements targeted to the anticipated set of authentication capabilities 180. In an example of cellular handsets, a baseline of authentication mechanisms provided by a multitude of handset manufacturers may be surveyed. The relying party 110 may target the lowest common denominator by enumerating each requirement based on the handset survey.

In another embodiment, the relying party 110 may define the set of authentication requirements 120 by an authentication method category. This has the advantage of allowing the authentication service 130 a degree of flexibility in determining how to enforce the authentication policy. In one example, the relying party 110 may specify a biometric authentication requirement category as one of the set of authentication requirements 120. The authentication service 130 would then have the flexibility to select an authentication mechanism based on the set of available authentication preferences 160. If the set of authentication preferences 160 indicate that fingerprint scan, iris scan, or deoxyribonucleic acid (DNA) sequencing are available, the authentication service 130 may thus select from one of those capabilities to satisfy the biometric authentication requirement.

In another embodiment, as indicated above, the relying party 110 may request the authentication requirements 120 in the form of either a minimum authentication score or a minimum authentication score together with a list of permitted authentication factor types.

The relying party 110 may generate and store the authentication requirements 120 locally, for provision to the authentication service 130 when requesting authentication. Alternately, the authentication requirements 120 may be determined only at the time of the request for authentication. The authentication requirements 120 are communicated from the relying party 110 to the authentication service 130.

The authentication service 130 is the "middle man" for authentication, performing authentication on behalf of the relying party upon request. The authentication service 130 comprises an authentication policy engine 140.

The authentication policy engine 140 performs the authentication, requesting credentials from the user and comparing those credentials with the enrolled credentials 145. As indicated above, the authentication service stores information about each registered device 149 that is associated with a user. In addition, the authentication service 130 stores a set of authentication capabilities or factors 147 for each registered device 149, information 143 about which of the registered devices 149 are capable of performing out-of-band authentication. The authentication service 130 also stores credential information and authentication preferences 145 for each enrolled user. The authentication factors indicate the authentication factors that the user prefers or is willing to use for authentication. As indicated above, the authentication preferences may be stored as a global collection of that user's preferred authentication factor types or as a device-specific collection of the authentication factors available on that device that are preferred by the user. Each authentication factor has an authentication factor type, and each authentication factor type has an associated authentication value. The authentication value for the authentication factor type may be considered a level of confidence in the authentication factors of that type or a level of security provided by that type of authentication factor. In one embodiment, the authentication value for each authentication factor type is an integer value.

The authentication policy engine 140 compares the authentication requirements of the relying party 110 with the available preferred capabilities of the user. Because a user may have multiple registered devices available for authentication, the authentication engine 140 may perform authentication using multiple user equipment 170, each with different authentication factors 180. In general, the authentication policy engine 140 determines whether the user has sufficient authentication factors or capabilities to meet the requirements of the relying party. If the user's devices do not have sufficient authentication factors, the authentication cannot succeed, and the authentication policy engine 140 may indicate failure to the relying party without requesting credentials from the user. If the user's devices are capable of meeting the relying party's authentication requirements, then the authentication policy engine 140 performs authentication in accordance with those requirements, requesting credentials from the user and comparing those credentials with the enrolled credentials 145.

In one embodiment, if the user has enrolled credentials and registered devices that meet the authentication requirements, the user's authentication preferences may be overridden if necessary to meet the relying party 110's authentication requirements.

In an embodiment in which the relying party provides only a minimum authentication score to the authentication service, the authentication engine 140 may use as candidate authentication factors any authentication factor available for the user's device, including out-of-band authentication factors, possibly constrained by user preferences.

In an embodiment in which the relying party 110 provides both a minimum authentication score and a list of the permitted authentication factor types, the authentication policy engine 140 may filter the available authentication factors to limit the candidate authentication factors to only the ones permitted by the relying party.

The authentication policy engine 140 may use any of the candidate authentication factors, so long as their combined authentication value at least matches the minimum required score The authentication values may be determined by the authentication policy engine 140 in some embodiments; in other embodiments, the relying party 110 may provide values for the authentication values for at least some of the authentication factor types. If a combination of candidate authentication factors can be found that at least meets the minimum authentication score required by the relying party 110, authentication can proceed. If no combination of candidate authentication factors is found that meets the relying party 110's requirements and the candidate authentication factors were constrained by the user's preferences, the attempt to determine a combination of authentication factors may be redone, ignoring the user's preferences. If no such combination exists, even ignoring the user's preferences, authentication fails and the relying party 110 may be informed of the failure, so that it can disallow access to the requested resource, without ever asking the user to provide credentials for authentication.

Once the authentication policy engine 140 finds a collection of the candidate authentication factors that meets the relying party 110's requirements, the authentication policy engine 140 proceeds with the authentication attempt, requesting credentials from the user that correspond to each candidate authentication factor and comparing them with the enrolled or registered credentials. The resulting success or failure of the authentication is then communicated to the relying party 110.

For example, the relying party 110 may present a minimum authentication score of 50, but does not specify what authentication factors types should be used. The authentication policy engine may apply a default authentication value of 10 to a username and password combination, and a default authentication score of 30 to a fingerprint scan. The individual factors are summed, producing a combined score of 40, which is compared against the relying party 110's required minimum score of 50. Because the combined authentication score is less than the required minimum authentication score, the authentication fails, without even requesting the user to supply a fingerprint or enter a username and password. If an additional authentication factor having an authentication score of at least 10, such as an out-of-band authentication using another trusted device, the combined authentication score meets the minimum confidence requirements, and the authentication attempt may proceed to use the selected authentication features to authenticate the user.

User authentication begins with a request for to access a relying party 110's resource from user equipment 170, which is has previously been registered with the authentication service 130. User equipment 170 may encompass various types of computing devices from which users may confirm their identity. Personal computers, cellular handsets, and even wearable computing devices may be user equipment 170.

A user agent 150 resides internal to the user equipment 170. The user agent 150 in one embodiment may be an application that executes on the user equipment 170. Other embodiments may provide the user agent 150 as a portion of an operating system controlling the user equipment 170. The user agent 150 provides the interface to the user and is the human interface point for the rest of the authentication system.

During enrollment of the user equipment 170 with the authentication service 130, the user agent 150 may query the user equipment 170 to determine the device's authentication capabilities 180, providing the authentication capabilities to the authentication service 130 as authentication factors 147. For example, if the user equipment contains a fingerprint reader, fingerprint recognition may be an authentication capability of the user equipment 170. Embodiments may allow identification of capabilities at any time thereafter, for example in the event that an additional authentication capability is installed on the user equipment 170. The authentication capabilities 180 may also be locally stored by the user agent 150, if desired.

Additionally, the user agent 150 may provide local storage of user authentication preferences 160 in one embodiment. The authentication preferences 160 may be set and provided to the authentication service 130 when the user enrolls with the authentication service 130 via the user agent 150 or at any other time afterwards. The user preferences may indicate that any authentication capability of the user equipment 170 may (or may not) be used for authentication. For example, if the user equipment 170 provides the authentication capability 180 of a biometric input device of some type, such as an iris scanner or fingerprint scanner, the user may select the biometric input device as one of their authentication preferences 160. In another example, a user may have a camera that could be used for an iris scan, but not wish the camera to be used for authentication. At the time of authentication to the authentication service, the preferred authentication capabilities 180 may be used to input the applicable authentication credentials. The authentication preferences 160 may also be locally stored by the user agent 150, if desired.

The set of authentication capabilities 180 may also include out of band authentication capabilities, which may be implemented as part of a different device other than the user device 170. For example, an out-of-band authentication preference could be a fingerprint scanner on a cellular handset generally in the physical possession of the user seeking authentication from a personal computer. These out of band authentication capabilities may also be identified to the authentication service 130 as part of enrollment or at any time thereafter.

The relying party 110, the user equipment 170 and the authentication service 130 each use a network interface to communicate via one or more networks, such as the Internet or local area networks. The communication between all parties can be implemented inter-process messaging, a networking protocol, or a combination thereof.

Figure 2:
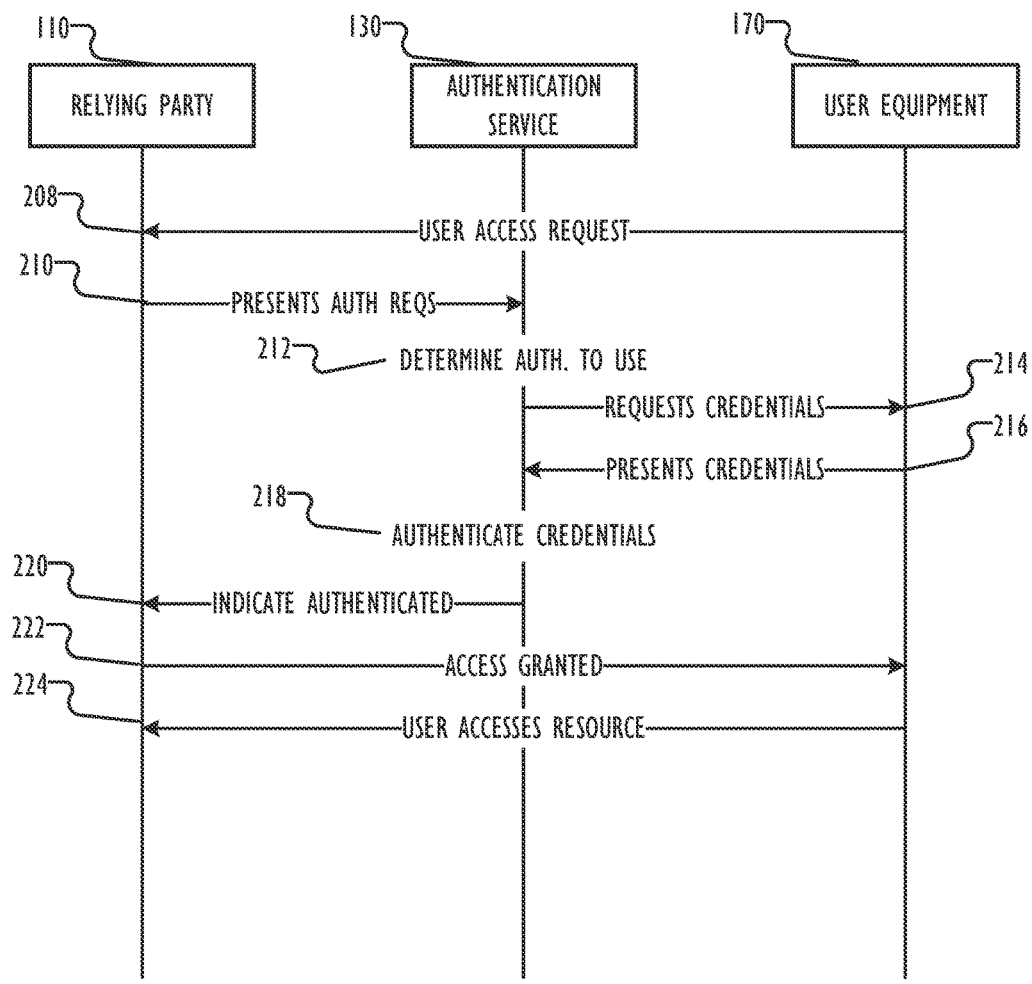
FIG. 2 is an activity diagram demonstrative of the actors and actions for enforcing an authentication policy using an authentication service according to one embodiment.

FIG. 2 is an activity diagram demonstrative of the actors and actions for enforcing an authentication policy using an authentication service according to one embodiment. The activity diagram shows the relationship between the actors and the actions, as well as the relationships between actors and other actors.

In this embodiment, it is assumed that a user has already enrolled the user equipment 170 with the authentication service 130.

The initial action that begins the process of authentication is the user equipment 170 requesting access 208 to a resource controlled by the relying party 110. A typical use case for this type of action would be a user on a mobile device attempting to log in to a web site. The mobile device would be representative of user equipment 170 and the web site for which access was being sought would be the relying party 110.

Upon receiving the access request 208 from the user equipment 170, the relying party 110 then presents the authentication service 130 with authentication requirements 210.

The authentication service 130 determines in action 212 what authentication factors should be used for authenticating the user and user equipment 170 to the relying party 110, as discussed above. Assuming a set of candidate authentication factors meet the relying party 110's requirements, the authentication service 130 may request credentials from the user equipment 170 in action 214. The user replies with the requested credentials, providing passwords, biometric data, or whatever type of authentication factor is used in action 216. The authentication service 130 may then evaluate the credentials in action 218, comparing them with the corresponding enrolled credentials, and determine whether authentication is successful or fails. As illustrated in FIG. 2, authentication is successful and in action 220 the authentication service 130 indicates success to the relying party 110. The relying party 110 may then indicate to the user equipment in action 222 that access to the desired resource is granted, and the user may begin accessing the desired resource in action 224. Similarly, but not shown for clarity, if authentication failed, the authentication service 130 may indicate failure to the relying party 110, which then denies access to the resource and informs the user that access has been denied.

Figure 3:
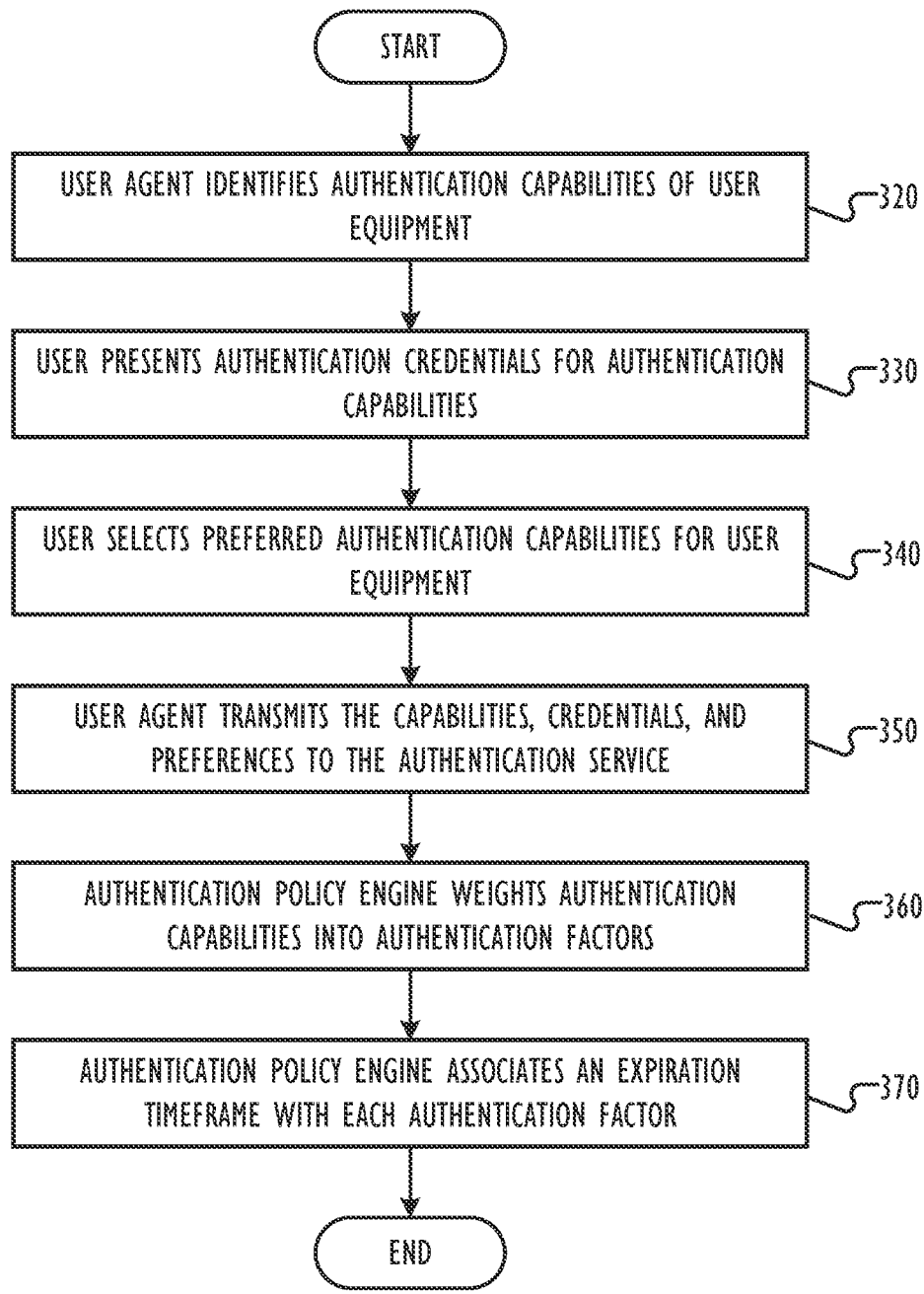
FIG. 3 is a flowchart illustrating a technique for enrolling a user with an authentication service according to one embodiment.

FIG. 3 is a flowchart illustrating a technique for enrolling a user with an authentication service 130 according to one embodiment. Prior to authentication, the user and user equipment 170 are enrolled with the authentication service, providing credentials that can be used for later authentication attempts.

In one embodiment, the user equipment 170 may identify all authentication factors available on the user equipment 170 in block 320. If the user equipment 170 was a laptop computer with both a fingerprint scanner, microphone, and webcam, the list of authentication factors may comprise fingerprint, voice pattern analysis, and iris or facial scan, in addition to entering textual usernames and passwords. As explained above, the user equipment 170 may indicate some out-of-band authentication factors are available that may be provided by another piece of equipment associated with the user, such as a smart phone associated with the user.

Upon the collection of authentication capabilities, the user presents authentication credentials for each authentication factor in block 330. For example, if a fingerprint reader is one authentication factor, obtaining the corresponding credential includes providing a fingerprint swipe for a fingerprint scanner.

At block 340, the user may selects authentication preferences from the list of authentication factors or capabilities available from the user equipment 170. Using the laptop computer example, the user may prefer the fingerprint authentication and the voice pattern analysis, but not select the iris or facial scan. As described above, the authentication service will attempt to honor the user's preferences, but may override them if necessary to obtain sufficient authentication factors to allow authentication.

The authentication capabilities, credentials, and user's preferences are transmitted to the authentication service 130 at block 350.

In one embodiment the authentication policy engine 140 applies an authentication score value to each of the available authentication capabilities at block 360. The authentication score value is typically an integer value, where a higher number implies a higher reliability or security of that authentication factor, but any other desired scoring scheme may be used.

Wherever the above description involves sending information to the authentication service 130, the data may be sent in response to a request for the information by the authentication service 130. In addition, in some embodiments the authentication policy engine may also apply an expiration timeframe to each authentication factor in block 370. As described in more detail below, embodiments may allow the authentication service 130 to reuse authentications performed previously, where the reused authentications involve authentication factors whose authentication timeframe has not expired.

Upon expiration of the timeframe, if that authentication capability was used to meet an authentication requirement, the user would have to re-authenticate by re-entering the associated authentication credential. Different types of authentication factors have may different expiration timeframes. For example, an iris scan may have a long expiration window, as iris features are unique to an individual, and they do not change much over time. In contrast, a username and password, which are frequently changed and may be attacked by brute force, snooping, or breach, may be assigned a smaller expiration window. In one embodiment, if the authentication service is notified that the enrolled credentials for an authentication factor have changed, the authentication service can force expiration of any authentication using that authentication factor.

In some instances, this may require the user to re-authenticate using more than one authentication factor until the authentication requirement is met.

Figure 4:
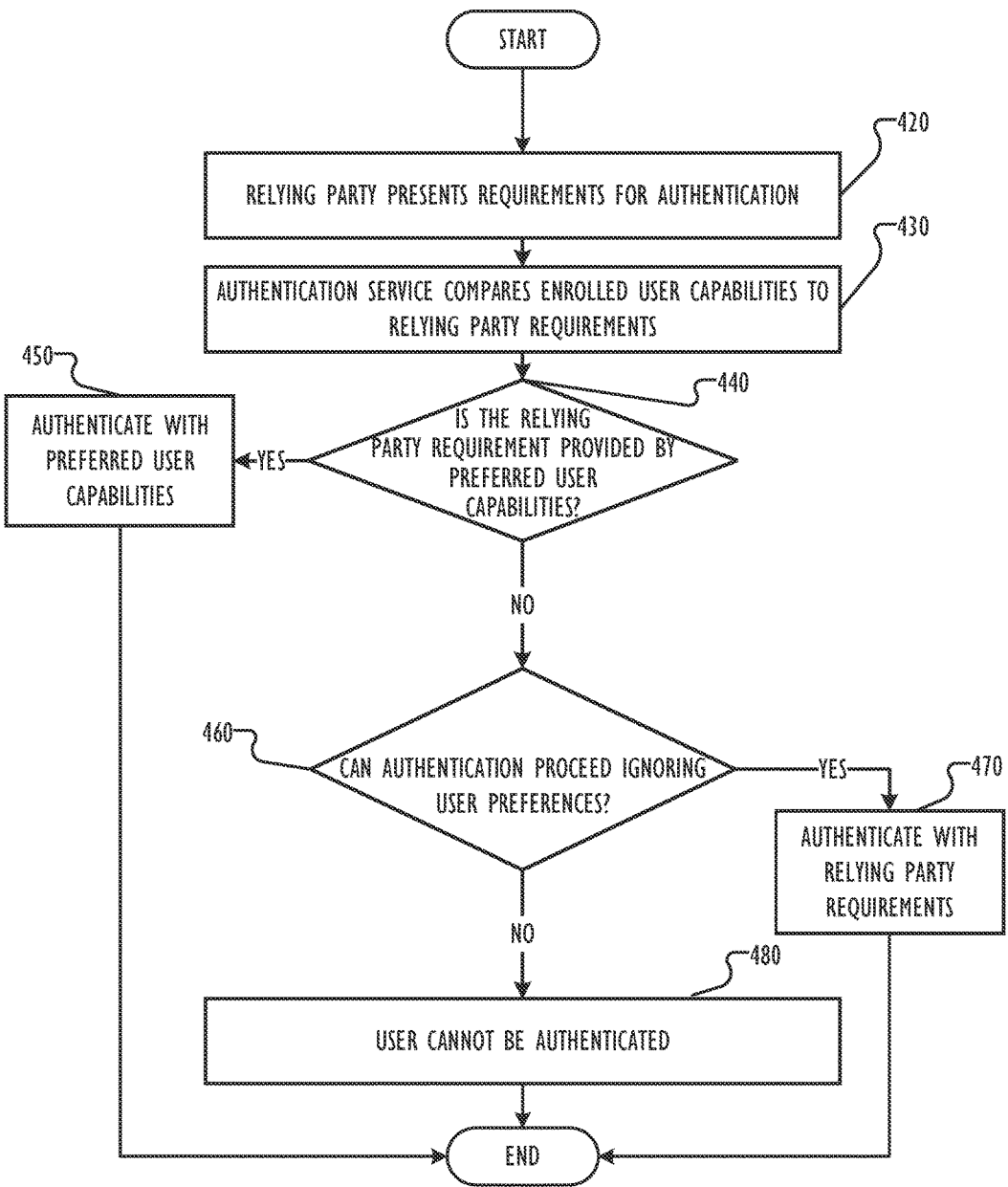
FIG. 4 is a flowchart illustrating a technique for authenticating a user according to one embodiment.

FIG. 4 is a flowchart illustrating a technique for authenticating a user according to one embodiment.

To begin the process for authentication of a user, a relying party 110 may present requirements for authentication in block 420, as described above. In block 430, the authentication policy engine 140 compares the enrolled authentication factors and user preferences with the authentication requirements presented by the relying party 110.

In block 440, if the preferred collection of available authentication factors is sufficient to meet the requirements, then in block 450 the authentication policy engine 140 may authenticate the user using some or all of the preferred authentication factors, as needed to meet the authentication requirements. If the preferred authentication factors are insufficient to meet the requirements, in block 460 the authentication policy engine may compare the available authentication factors against the authentication requirements. If authentication can proceed if the user preferences are ignored, then in one embodiment those preferences may be ignored and authentication may proceed in block 470 using the set of authentication factors that comply with the relying party 110's requirements. If authentication is attempted in block 450 and 470, the authentication policy engine requests the appropriate credentials from the user equipment 170, and compares them with the enrolled credentials for that authentication factor.

In an embodiment where user preferences cannot be overridden, or where the relying party 110's requirements cannot be met even ignoring the user preferences, the authentication policy engine 140 may notify the relying party 110 in block 480 that authentication could not be attempted. In some embodiments, this notification may be a different indication that one indicating that authentication was attempted, but the user's credentials were incorrect.

Figure 5:
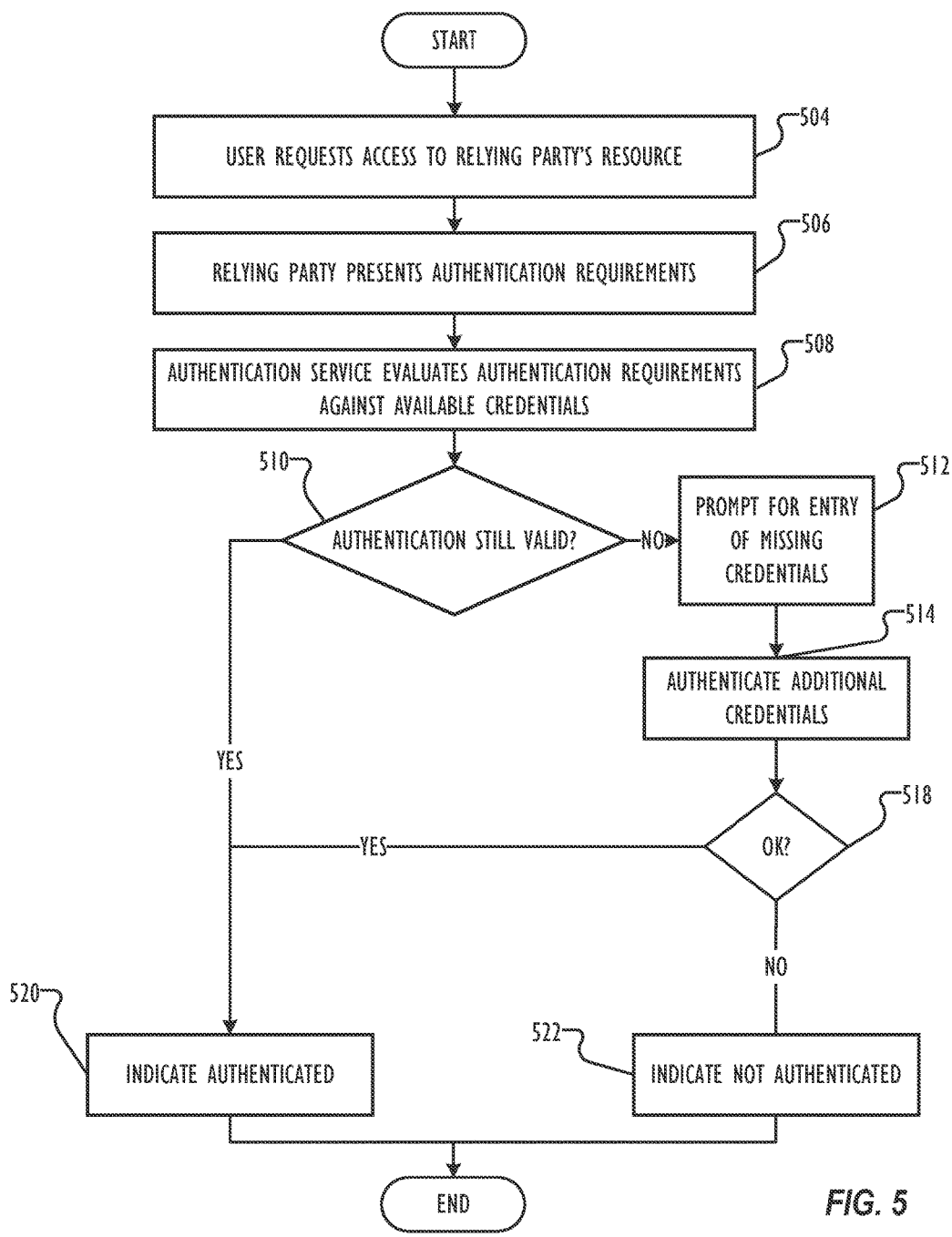
FIG. 5 is a flowchart illustrating a technique for re-using previously authenticated user credentials to access one or more relying party resources according to one embodiment.

FIG. 5 is a flowchart illustrating a technique for utilizing user credentials to access one or more relying party resources that allows reusing previous authentications according to one embodiment.

At block 504, the user attempts access to a relying party 110's resource. A common example of this interaction would be a user directing a web browser to access a secure website such as Facebook, or a web-based email system.

At block 506, the authentication service receives the authentication requirements of the relying party 110. For the purposes of this discussion, the nature of the authentication requirements is not material.

At block 508, the authentication policy engine 140 evaluates the requirements and the sets of corresponding available authentication factors. As described above, the authentication service 130 evaluates the available preferences and capabilities to determine if the authentication requirements can be met by the available authentication factors. In FIG. 5, the assumption is that the requirements can be met by at least one authentication factor that has previously been used to authenticate user credentials.

In one embodiment, each authentication factor has a timeframe associated with it. In block 510, the authentication policy engine 140 may check the associated timeframe of each of the authentication factors to be used for authentication that have been successfully used for authentication previously. If the timeframe for that authentication factor has not expired, the previous authentication is still valid and can be used. In that case, in block 520 the authentication policy engine 140 may indicate that authentication using that authentication factor has succeeded, without re-asking the user to provide the corresponding credentials.

If the timeframe for that authentication factor has expired, the previous authentication is no longer valid. Therefore, in block 512 the authentication policy engine may request the user to provide the corresponding credentials, which are then authenticated in block 514. In block 518, if the newly supplied credentials are acceptable, then in block 520 the authentication policy engine 140 may indicate that authentication using that authentication factor has succeeded. Otherwise, in block 522 the authentication policy engine 140 may indicate authentication failed.

This allows the authentication service 130 to prompt the user only for credentials that are necessary for authentication, without asking for previously provided and authenticated credentials. This has the advantageous effect of saving the user from re-entry if the authentication credentials are still valid.

In one embodiment, the ability to reuse previously provided and authenticated credentials is not limited to authentications for the same relying party. A user may be authenticated by the authentication service 130 on behalf of a first relying party 110. Subsequently, the user may attempt to access another relying party 110's resource. The credentials that were used for authenticating the user on behalf of the first relying party 110 may be used for authenticating the user no behalf of the second relying party 110. This may mean, for example, that the authentication to the second relying party 110 may be accomplished without having to request any credentials from the user, if all of the previously provided credentials are (a) still valid, and (b) to be used for authenticating the user to the second relying party. In other scenarios, the second authentication procedure may reuse some of the previous authentications and require new credentials for some new authentications, depending on the overlap of authentication requirements of the two relying parties 110 and the relevant timeframes.

Figure 6:
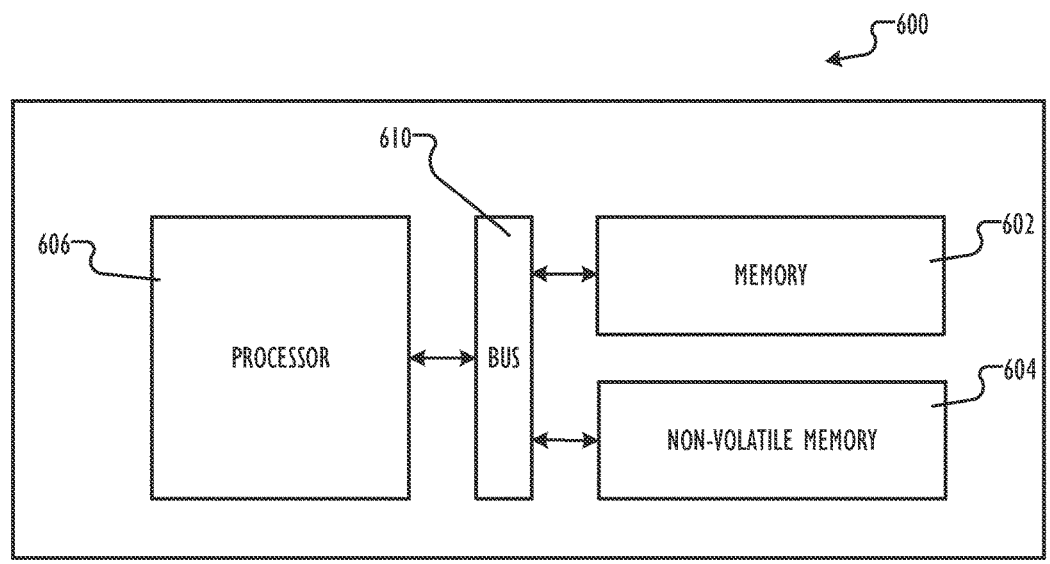
FIG. 6 is a block diagram illustrating a system of components for building and enforcing an authentication policy according to one embodiment.

FIG. 6 is a block diagram illustrating a system of components that may be used to build and enforce an authentication policy according to one embodiment.

A computer 600 is utilized to build and enforce an authentication policy, and includes a processor 606, a memory 602, and a non-volatile memory 604. Although only a single instance of each component is illustrated in FIG. 6, any number of the components may be used as desired, such as any number of processors 606, including multiple cores, etc. In addition, other component known in the art of programmable devices may be included in the computer 600. As illustrated in FIG. 6, a bus 610 connects the processor 606 to the memory 602 and non-volatile memory 604. Use of a bus is illustrative and by way of example, and other techniques for coupling elements of the computer 600 may be used, including point-to-point interconnects.

The processor 606 handles the computational aspect of the policy. The processor 606 executes the commands stored in the memory 602 and loads commands stored in the non-volatile memory 604 into the memory 602 for execution. The non-volatile memory 604 may be a storage device of any desired type, including magnetic and optical media, including removable media, on which are stored the instructions that when executed cause the processor 606 to perform the actions described herein.

The memory 602 holds the software necessary to build and enforce the policy, including the authentication policy engine 140 and/or the user agent 150. Additionally, during execution the relying party's set of authentication requirements may be contained in memory 602 as well as the authentication data corresponding to the user equipment 170.

The non-volatile memory 604 be used for longer-term storage of any of the data used by the authentication policy engine 140 or the user agent 150.

The following examples pertain to further embodiments.

Example 1 is a system for authenticating a user to a relying party, comprising: one or more processors; and memory coupled to the one or more processors on which are stored instructions, comprising instructions that when executed cause at least some of the one or more processors to: receive a set of authentication requirements from a relying party; compare the set of authentication requirements with a set of available authentication factors for a user device; select a set of candidate authentication factors corresponding to the set of authentication requirements; authenticate the user on the user device using the candidate authentication factors; and indicate success or failure of the authentication.

In Example 2 the subject matter of Example 1 optionally includes wherein the set of authentication requirements comprises a minimum authentication score.

In Example 3 the subject matter of Example 2 optionally includes wherein the set of authentication requirements further comprises a set of permitted authentication factors.

In Example 4 the subject matter of Example 4 optionally includes wherein the instructions that when executed cause at least some of the one or more processors to determine whether the authentication previously performed using the candidate authentication factor can be reused comprise instructions that when executed cause at least some of the one or more processors to: evaluate an expiration timeframe associated with the candidate authentication factor; and determine the authentication previously performed can be reused responsive to an evaluation that the expiration timeframe has not expired.

In Example 6 the subject matter of Example 1 optionally includes wherein the set of candidate authentication factors is limited by a set of user preferences.

In Example 7 the subject matter of Example 6 optionally includes wherein the instructions that when executed cause at least some of the processors to select a set of candidate authentication factors comprise instructions that when executed cause at least some of the processors to ignore the set of user preferences if the set of candidate authentication factors as limited by the set of user preferences is insufficient to meet the minimum authentication requirements.

Example 8 is a machine readable medium, on which are stored instructions for authenticating users, comprising instructions that when executed cause a machine to: receive a set of authentication requirements from a relying party; compare the set of authentication requirements with a set of available authentication factors for a user device; select a set of candidate authentication factors corresponding to the set of authentication requirements; authenticate the user on the user device using the candidate authentication factors; and indicate success or failure of the authentication.

In Example 9 the subject matter of Example 8 optionally includes wherein the set of authentication requirements comprises a minimum authentication score.

In Example 10 the subject matter of Example 9 optionally includes wherein the set of authentication requirements further comprises a set of permitted authentication factors.

In Example 11 the subject matter of Example 11 optionally includes wherein the instructions that when executed cause the machine to determine whether the authentication previously performed using the candidate authentication factor can be reused comprise instructions that when executed cause the machine to: evaluate an expiration timeframe associated with the candidate authentication factor; and determine the authentication previously performed can be reused responsive to an evaluation that the expiration timeframe has not expired.

In Example 13 the subject matter of Example 13 optionally includes wherein the instructions that when executed cause the machine to select a set of candidate authentication factors comprises instructions that when executed cause the machine to ignore the set of user preferences if the set of candidate authentication factors as limited by the set of user preferences is insufficient to meet the minimum authentication requirements.

In Example 15 the subject matter of Example 8 optionally includes wherein the one or more authentication factors comprises an out of band authentication factor.

Example 16 is a method for authenticating users, comprising: receiving a set of authentication requirements from a relying party; comparing the set of authentication requirements with a set of available authentication factors for a user device; selecting a set of candidate authentication factors corresponding to the set of authentication requirements; authenticating the user on the user device using the candidate authentication factors; and indicating success or failure of the authentication.

In Example 17 the subject matter of Example 16 optionally includes wherein the set of authentication requirements comprises a minimum authentication score.

In Example 18 the subject matter of Example 17 optionally includes wherein the set of authentication requirements further comprises a set of permitted authentication factors.

In Example 19 the subject matter of Example 19 optionally includes wherein determining whether the authentication previously performed using the candidate authentication factor can be reused comprises: evaluating an expiration timeframe associated with the candidate authentication factor; and determining the authentication previously performed can be reused responsive to an evaluation that the expiration timeframe has not expired.

In Example 21 the subject matter of Example 19 optionally includes wherein the set of candidate authentication factors is limited by a set of user preferences.

In Example 22 the subject matter of Example 21 optionally includes further comprising ignoring the set of user preferences if the set of candidate authentication factors as limited by the set of user preferences is insufficient to meet the minimum authentication requirements.

In Example 23 the subject matter of Example 19 optionally includes wherein the one or more authentication factors comprises an out-of-band authentication factor.

Example 24 is an apparatus comprising: a processor; and a memory coupled with the processor, on which are stored instructions, comprising instruction that when executed cause the processor to: receive a set of authentication requirements from a relying party; compare the set of authentication requirements with a set of available authentication factors for a user device; select a set of candidate authentication factors corresponding to the set of authentication requirements; authenticate the user on the user device using the candidate authentication factors; and indicate success or failure of the authentication.

In Example 25 the subject matter of Example 24 optionally includes wherein the set of authentication requirements comprises a minimum authentication score.

In Example 26 the subject matter of Example 25 optionally includes wherein the set of authentication requirements further comprises a set of permitted authentication factors.

In Example 27 the subject matter of Example 27 optionally includes wherein the instructions that when executed cause the processor to determine whether the authentication previously performed using the candidate authentication factor can be reused comprise instructions that when executed cause the processor to: evaluate an expiration timeframe associated with the candidate authentication factor; and determine the authentication previously performed can be reused responsive to an evaluation that the expiration timeframe has not expired.

In Example 29 the subject matter of Example 29 optionally includes wherein the instructions that when executed cause the processor to select a set of candidate authentication factors comprises instructions that when executed cause the processor to ignore the set of user preferences if the set of candidate authentication factors as limited by the set of user preferences is insufficient to meet the minimum authentication requirements.

In Example 31 the subject matter of Example 24 optionally includes wherein the one or more authentication factors comprises an out of band authentication factor.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A system for authenticating a user to a relying party, comprising:
one or more processors; and
memory in communication with the one or more processors, the memory having instructions which, when executed, cause the one or more processors to at least:
access a set of authentication requirements received from the relying party, the set of authentication requirements including a threshold authentication score;
determine a filtered set of available authentication factors for a user device, the filtered set of available authentication factors to include only authentication factors that are user preferred authentication factors, and respective ones of the available authentication factors having respective authentication values;
attempt to select a subset of the filtered set of available authentication factors, the subset of the filtered set having a combined authentication value that meets the threshold authentication score, the attempt to select to include:
identifying respective subsets of the filtered set of available authentication factors;
generating respective, combined authentication values for the respective subsets; and
determining whether any of the respective, combined authentication values of the respective, subsets of the filtered set of available authentication factors meets the threshold authentication score;
when none of the respective subsets of the filtered set of authentication factors has a combined authentication value that meets the threshold authentication score, cause the authentication to fail, without attempting authentication using any of the set of candidate authentication factors;
when at least one of the respective subsets of the filtered set of authentication factors has a combined authentication value that meets the threshold authentication score, use a selected one of the at least one of the respective subsets of the filtered set of authentication factors to attempt authentication of the user on the user device; and
indicate success or failure of the authentication.

2. The system of claim 1, wherein the set of authentication requirements further includes a set of permitted authentication factors, and the set of candidate authentication factors is limited by the set of permitted authentication factors.

3. The system of claim 1, wherein the instructions further cause the one or more processors to:
determine whether a previously performed authentication can be reused; and
reuse the previously performed authentication, responsive to the determination, without requesting credentials from the user.

4. The system of claim 3, wherein the instructions cause the one or more processors to determine whether the previously performed authentication can be reused by:
evaluating whether an expiration timeframe associated with a first authentication factor of the selected subset of the filtered authentication factors has expired; and
determining the previously performed authentication can be reused responsive to an evaluation that the expiration timeframe has not expired.

5. A non-transitory machine readable medium, comprising instructions which, when executed by a machine, cause the machine to at least:
access authentication requirements received from a relying party, the authentication requirements including a threshold authentication score;
determine a filtered set of available authentication factors for a user device, respective ones of the filtered set of available authentication factors associated with respective authentication values, and the filtered set of available authentication factors to exclude authentication factors that are not user preferred authentication factors;
attempt to select a subset of the filtered set of available authentication factors having a combined authentication value that meets the threshold authentication score;
when the attempt to select the subset of the filtered set of available authentication factors having a combined authentication value that meets the threshold authentication score fails, cause the authentication to fail, without requesting that a user of the user device supply any authenticating inputs;
when the attempt to select the subset of the filtered set of available authentication factors having a combined authentication value that meets the threshold authentication score succeeds, attempt to authenticate the user on the user device using the selected subset of the filtered set of available authentication factors; and
indicate success or failure of the attempt to authenticate.

6. The machine readable medium of claim 5, wherein the set of authentication requirements further includes a set of permitted authentication factors, and the filtered set of available authentication factors is limited by the set of permitted authentication factors.

7. The machine readable medium of claim 5, wherein the instructions further cause the machine to:
determine whether a previously successful authentication can be reused; and
reuse the previously successful authentication, responsive to the determination, without requesting credentials from the user.

8. The machine readable medium of claim 7, wherein the instructions cause the machine to determine whether the previously successful authentication can be reused by:
evaluating whether an expiration timeframe associated with a first one of the selected subset of the filtered set of available authentication factors has expired; and
determining the previously successful authentication can be reused responsive to an evaluation that the expiration timeframe has not expired.

9. The machine readable medium of claim 5, wherein the filtered set of available authentication factors includes an out of band authentication factor.

10. A method for authenticating a user to a relying party, the method comprising:

receiving a set of authentication requirements from the relying party, the set of authentication requirements including a threshold authentication score;

determining a set of available authentication factors for a user device, the set of available authentication factors filtered to exclude available authentication factors that are not user preferred, and respective ones of the set of available authentication factors having respective authentication values, the respective authentication values representing a level of confidence in the respective authentication factors;

attempting to select a subset of the set of available authentication factors, the subset of the set of available authentication factors having a combined authentication value that meets the threshold authentication score;

when the attempt to select the subset of the set of available authentication factors having a combined authentication value that meets the threshold authentication score fails, causing the authentication to fail without attempting to authenticate the user of the user device;

when the attempt to select the subset of the set of available authentication factors having a combined authentication value that meets the threshold authentication score succeeds, attempt to authenticate the user on the user device using the selected subset of the set of available authentication factors; and indicating success or failure of the attempt to authenticate the user.

11. The method of claim 10, wherein the set of authentication requirements further includes a set of permitted authentication factors, and the set of available authentication factors is further filtered based on the set of permitted authentication factors.

12. The method of claim 10, further including:

determining whether an authentication previously performed using a first available authentication factor of the set of available authentication factors can be reused; and reusing the authentication, responsive to the determination, without requesting credentials from the user for the first available authentication factor.

13. The method of claim 12, wherein the determining of whether the authentication previously performed using the first available authentication factor can be reused includes:

evaluating whether an expiration timeframe associated with the first available authentication factor has expired; and determining the authentication previously performed can be reused responsive to an evaluation that the expiration timeframe has not expired.

14. The method of claim 10, wherein the set of available authentication factors includes an out-of-band authentication factor.

\* \* \* \* \*